United States Patent
Eberhardt et al.

(10) Patent No.: US 12,479,763 B2
(45) Date of Patent: Nov. 25, 2025

(54) METHODS FOR OBTAINING AGGREGATES AND/OR POWDER-TYPE MINERAL MATERIAL UTILIZING PROCESS AUXILIARIES

(71) Applicant: SIKA TECHNOLOGY AG, Baar (CH)

(72) Inventors: Arnd Eberhardt, Winterthur (CH); Patrick Juilland, Bern (CH); Luis Pegado, Brugg (CH); Emmanuel Gallucci, Zürich (CH); Lukas Frunz, Dietikon (CH)

(73) Assignee: SIKA TECHNOLOGY AG, Baar (CH)

( * ) Notice: Subject to any disclaimer, the term of this patent is extended or adjusted under 35 U.S.C. 154(b) by 724 days.

(21) Appl. No.: 17/795,621

(22) PCT Filed: Feb. 19, 2021

(86) PCT No.: PCT/EP2021/054156
§ 371 (c)(1),
(2) Date: Jul. 27, 2022

(87) PCT Pub. No.: WO2021/170501
PCT Pub. Date: Sep. 2, 2021

(65) Prior Publication Data
US 2023/0075895 A1  Mar. 9, 2023

(30) Foreign Application Priority Data

Feb. 25, 2020 (EP) .................................... 20159418

(51) Int. Cl.
*C04B 18/167* (2023.01)
(52) U.S. Cl.
CPC ................. *C04B 18/167* (2013.01)
(58) Field of Classification Search
CPC ..... C04B 18/167; C04B 14/10; C04B 20/023; C04B 20/026; C04B 22/0013; C04B 22/06; C04B 22/142; C04B 22/149; C04B 22/16; C04B 24/003; C04B 24/02; C04B 24/04; C04B 24/06; C04B 24/08; C04B 24/10; C04B 24/122; C04B 24/128; C04B 24/18; C04B 24/20; C04B 24/2647; C04B 2103/0051; C04B 2103/406; Y02W 30/91
See application file for complete search history.

(56) References Cited

U.S. PATENT DOCUMENTS

| | | | |
|---|---|---|---|
| 2009/0292041 A1 | 11/2009 | Bury et al. | |
| 2016/0024307 A1 | 1/2016 | Honert et al. | |

FOREIGN PATENT DOCUMENTS

| | | |
|---|---|---|
| DE | 19634533 A1 | 3/1998 |
| DE | 102017100746 B3 | 8/2017 |
| EP | 0 884 298 A2 | 12/1998 |
| EP | 1 103 570 A2 | 5/2001 |
| EP | 1 138 697 A1 | 10/2001 |
| EP | 2 800 725 A1 | 11/2014 |
| EP | 2 978 724 A1 | 2/2016 |
| EP | 3 498 681 A1 | 6/2019 |
| EP | 3 581 257 A1 | 12/2019 |
| EP | 3 756 983 A1 | 12/2020 |
| KR | 10-2013-0017681 A | 2/2013 |
| WO | 2014/040852 A1 | 3/2014 |
| WO | 2014/139857 A1 | 9/2014 |

OTHER PUBLICATIONS

Apr. 23, 2021 International Search Report issued in International Application No. PCT/EP2021/054156.
Aug. 30, 2022 International Preliminary Report on Patentability issued in International Application No. PCT/EP2021/054156.
Holmberg, K. et al. "Surfactants and Polymers in Aqueous Solution" Wiley-VCH, 2nd Edition, 2007.

*Primary Examiner* — Anthony J Green
(74) *Attorney, Agent, or Firm* — Oliff PLC

(57) ABSTRACT

Methods of obtaining aggregates and/or pulverulent mineral material from a starting material comprising hardened mineral binder and aggregates utilizing process auxiliaries selected from the group consisting of polycarboxylate ethers and/or esters (PCE), glycols, organic amines, especially alkanolamines, ammonium salts of organic amines with carboxylic acids, surfactants, especially nonionic surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, gluconate, iron sulfate, tin sulfate, antimony salts, alkali metal salts, alkaline earth metal salts, lignosulfonates, glycerol, melamine, melamine sulfonates, water absorbents in the form of a superabsorbent polymer or in the form of a sheet silicate, anticaking agents, sugars, sugar acids, sugar alcohols, phosphates, phosphonates, and mixtures thereof.

17 Claims, No Drawings

METHODS FOR OBTAINING AGGREGATES AND/OR POWDER-TYPE MINERAL MATERIAL UTILIZING PROCESS AUXILIARIES

TECHNICAL FIELD

The present invention relates to the use of process auxiliaries in a method of obtaining aggregates and/or pulverulent mineral material from a starting material that contains hardened mineral binder and aggregates and especially consists of demolition rubble or building waste.

BACKGROUND

There has to date been a large volume of disposal of demolition rubble or building waste material, for example hardened concrete or mortar, to landfill. Only comparatively small amounts are reused to some degree as raw material for low-tech applications in the construction industry.

Moreover, current practice is that demolition rubble, for example concrete, is comminuted and only the coarse fractions are reused, while the finer fractions can impair the properties of fresh and set concrete when reused and are therefore discarded. Therefore, current practice can be considered only to be incomplete.

However, demolition rubble or building waste material contain in general considerable amounts of useful constituents, for example aggregates or binder constituents, that can in principle be fully recycled and reused for new buildings. Furthermore, the disposal of waste in particular regions and countries has become ever more costly and difficult owing to new legislation in the last few years. In Europe, for example, European Guideline 2009/98/CE stipulates reuse of at least 70% by weight of inert demolition waste by 2020. Thus, the recycling of demolition rubble or building waste material will become an important topic in the near future.

EP 2 978 724 describes a method of obtaining aggregates and/or pulverulent mineral materials from demolition rubble or building waste material. The method comprises the steps of carbonation and comminution. In this method, however, problems can occur that are associated with the agglomeration of particles or the caking of the material and hence blockage of machines. Furthermore, the material throughput in such a method and hence also the output of aggregated and/or pulverulent mineral material may be slowed. Finally, the aggregates and mineral powders obtained by such a method are not optimized and can be improved further for use in hydraulically setting compositions.

There is therefore the need to provide suitable process auxiliaries for the methods of obtaining aggregates and/or pulverulent mineral materials from construction rubble or building waste material. Especially in order to increase the overall efficiency of these methods. There is also the need to provide suitable process auxiliaries which can be used in methods of obtaining aggregates and/or pulverulent mineral material from demolition or building waste, in order to improve the properties of the resulting materials, especially in connection with the use thereof in hydraulically setting compositions.

SUMMARY OF THE INVENTION

It is an object of the present invention to provide process auxiliaries for use in methods of obtaining aggregates and/or pulverulent mineral materials from demolition rubble or building waste material, in order to increase the overall efficiency of these methods. It is also an object of the present invention to provide suitable process auxiliaries for use in methods of obtaining aggregates and/or pulverulent mineral materials from demolition rubble or building waste material that can improve the properties of the resulting materials, especially in association with the use thereof in hydraulically setting compositions.

It has been found that, surprisingly, the objects can be achieved by the use of suitable process auxiliaries as described in the claims.

More particularly, the use of suitable process auxiliaries can reduce the energy input required during the process of the invention. Moreover, it is possible to shorten the disintegration process. It is also possible to increase the throughput in a process of the invention. In addition, it is possible to optimize the fineness and particle size distribution of the aggregates and/or pulverulent mineral materials obtained.

A further advantage is that the use of suitable process auxiliaries enables regulation of the process moisture content.

A particular advantage is the avoidance or considerable reduction of unwanted agglomeration of particles during a method of the invention. This especially prevents caking of or formation of coatings by particles.

The use of suitable process auxiliaries also introduces additional functionality into the aggregates and/or pulverulent mineral materials in the method of the invention, which is advantageous in the case of subsequent use in hydraulic compositions, especially in cement-bound building materials. For instance, it is possible to improve free flow, setting times, evolution of strength and surface properties of resulting hydraulic compositions.

Further aspects of the invention are the subject of further independent claims. Particularly preferred embodiments are presented in the description and the dependent claims.

Ways of Executing the Invention

A method of obtaining aggregates and/or pulverulent mineral material from a starting material comprising hardened mineral binder and aggregates comprises the following steps:

a) treating the starting material in a disintegration operation, especially under abrasive conditions, wherein the hardened mineral binder is at least partly, especially essentially completely, carbonated and removed from the surface of the aggregates, so as to give a pulverulent disintegration product;

b) separating off the treated starting material at a predefined grain size limit in order to obtain treated aggregates having a grain size of at least the predefined grain size limit and/or to obtain pulverulent mineral material having a grain size below the predefined grain size limit.

In the present context, the expression "starting material" represents any material comprising or consisting of hardened mineral binders and aggregates. More particularly, the starting material consists of demolition rubble or building waste material that comes from demolished constructions or buildings. The starting material may come from demolition operations and/or from landfill sites. As well as the hardened mineral binder and the aggregates, further materials may be present in the starting material, for example metals, plastics and/or wood. However, it may be advantageous to at least partly separate such materials prior to the treatment of the starting material. Preferably, the starting material comprises or consists of hardened mortar and/or concrete.

In particular, the starting material to be treated comprises or consists of hardened mineral binder bound to the surface of the aggregates. In particular, the hardened mineral binder at least partly surrounds the aggregates and/or binds multiple individual aggregates together.

In a preferred embodiment, the starting material is comminuted prior to the disintegration process or step a). This increases the surface area of the starting material, which in turn improves the disintegration process.

The expression "hardened mineral binder" relates more particularly to a mineral binder that has been hardened in a chemical hydration reaction in which hydrates have formed.

Preferably, the hardened mineral binder has hardened for at least 2 days, preferably at least 7 days, especially at least 28 or at least 60 days.

In particular, the hardened mineral binder comprises or consists of hardened hydraulic binder, for example hardened cementitious binder.

The hardened mineral binder may, however, also comprise or consist of hardened latently hydraulic and/or pozzolanic binder materials.

The expression "latently hydraulic and/or pozzolanic binders" especially means type II concrete aggregates with latently hydraulic and/or pozzolanic character according to EN 206-1. In particular, the latently hydraulic or pozzolanic binder comprises or consists of slag, fly ash, silica dust, activated clays and/or natural pozzolans.

In particular, the hardened mineral binder comprises or consists to an extent of 5-100% by weight, especially 50-100% by weight, more preferably 65-100% by weight, of hardened hydraulic binder.

In particular, the hardened mineral binder comprises or consists to an extent of 5-95% by weight of hardened hydraulic binder and to an extent of 95-5% by weight of hardened latently hydraulic and/or pozzolanic binder. Preferably, the hardened mineral binder may comprise or consist of 30-90% by weight of hardened hydraulic binder and 70-10% by weight of hardened latently hydraulic and/or pozzolanic binder.

Preferred hardened mineral binders comprise or consist of CEM type I, II, III, IV or V hardened cements according to standard EN 197, especially CEM type I or II. However, other types of cement may also be present.

In particular, the hardened hydraulic binder is hardened cement. Preferably, the latently hydraulic and/or pozzolanic binder is hardened slag and/or fly ash. A very preferred lately hydraulic binder is hardened slag.

The expression "rock aggregate" encompasses any kind of mortar and/or concrete aggregates. More particularly, the rock aggregates have a density of 2.2-3 kg/dm3. The rock aggregates especially include stone, gravel, sand or mixtures thereof. However, the rock aggregates may comprise or consist of light rock aggregates, especially expanded clay or polystyrene, or heavy rock aggregates, such as baryte, iron ore and the like.

In particular, the grain size of the aggregates is at least 0.125 mm or at least 0.250 mm. Preferably, the grain size of the rock aggregates is not more than 125 mm or not more than 32 mm. In particular, the grain size of the rock aggregates is 0.125-125 mm, especially 0.125-32 mm, especially 0.125-16 mm, for example 0.125-8 mm, or 0.125-5 mm.

In the present context, grain size is determined by sieve analysis, especially in sieves with square openings. In particular, the grain size is expressed by the opening size of the test sieves through which the grains or particles in question are still just able to pass.

The term "carbonation" in the present context is used for the reaction of mineral binder, especially of hardened mineral binder, with $CO_2$. For example, hardened cement of the CEM I type undergoes carbonation via reaction with $CO_2$ from the ambient air. This especially forms calcium carbonate. The progressive carbonation of mineral binder, especially of hardened mineral binder, is measurable via a drop in pH. For example, the progressive carbonation of concrete can be detected by spraying the concrete surface with an ethanolic phenolphthalein solution. Colorless areas indicate carbonated concrete; violet areas indicate uncarbonated concrete.

More particularly, "carbonation" in the present context means the incorporation of carbon dioxide into chemical compounds or the chemical reaction of carbon dioxide with the starting material. Thus, "carbonation" especially means a reaction of the starting material with carbon dioxide. The carbonation of hardened mineral binders, for example mortars or concrete, proceeds in a natural manner to a certain degree. However, the term "carbonation" here means a process in which carbonation is deliberately enhanced or accelerated compared to the natural process. This can be achieved by providing excess carbon dioxide.

For example, a hardened mineral binder in the form of hydraulic cement consisting essentially of calcium hydrates, silicate hydrates and aluminum hydrates can react with carbon dioxide and form corresponding carbonates.

In principle, the microstructure of the hardened mineral binder or of the binder matrix determines the rate of carbonation and the progression of a carbonation front from the exposed surface of the cement-bound material to its core.

The aim of the process of the present invention is the complete breakdown of the hardened mineral binder by carbonation, and additionally the removal of the carbonation front, especially by abrasion or disintegration. This can result in rapid recarbonation of the newly exposed surface. The treatment is performed continuously in an iterative process until a desired degree of removal (especially essentially complete removal) of the hardened mineral binder has been attained. This means that the hardened mineral binder is additionally removed from the surface of the aggregates. In particular, the hardened mineral binder is simultaneously and/or continuously carbonated and removed from the surface of the rock aggregates.

The progression of carbonation can be effected, for example, by measuring the partial $CO_2$ pressure during a process of the invention. If there is a drop in the partial $CO_2$ pressure, carbonation is taking place. If there is no further drop in the partial $CO_2$ pressure during the disintegration operation, essentially complete carbonation can be assumed. Alternatively, the progression of carbonation can also be determined, for example, by measuring the pH of the mixture during the disintegration operation. If there is a drop in the pH during the disintegration operation, carbonation is taking place. If there is no further drop in the pH during the disintegration operation, essentially complete carbonation can be assumed. This is typically the case at a pH of 7-10, preferably 7-9.

In a particular embodiment of the present invention, a method of the invention comprises a step a) consisting of the treatment of the starting material in a disintegration operation, especially under abrasive conditions, with carbonation of the hardened mineral binder and removal from the surface of the aggregates, so as to form a pulverulent disintegration product, wherein the carbonation is continued until a pH of the mixture of 7-10, preferably 7-9, is attained.

The disintegration process or step a) is preferably conducted under abrasive conditions. These are conditions under which the starting material and any breakdown products formed move against one another in close contact. This results in high shear forces and friction. Ultimately, these processes lead to effective removal of hardened mineral binder and/or carbonated material from the surface of the aggregates via mechanical abrasion or disintegration.

In particular, in step a), the hardened mineral binder and/or carbonated material is removed from the surface of the rock aggregates by mechanical abrasion and/or abrasion. The material is especially removed by mechanical force that acts on the starting material. The mechanical force leads to high friction, impact and abrasion, or abrasion of the starting material or of the hardened mineral binder and/or of the carbonated material.

The mechanical force and/or abrasion may be caused by movement of the starting material. This involves enclosing the starting material, for example in a defined volume, and subjecting it to movement. This especially induces high shear forces and abrasion or disintegration.

Preferably, the density of solid material, especially of starting material and/or carbonated material, in the processing volume is about 10-80% by volume, especially 15-75% by volume, especially 20-70% by volume, more preferably 30-65% by volume or 40-60% by volume. The term "processing volume" means the volume in which the mechano-chemical process is effectively conducted. In other words, the processing volume is defined as the space in which the material to be treated, especially the starting material, is subjected to the carbonation and/or abrasion and/or disintegration.

In particular, the material to be processed, especially the starting material, fills the processing volume in accordance with the abovementioned densities, such that the movement of the material gives rise to abrasive contacts between the particles. For stirring and/or for creation of abrasive conditions, it is possible to use a stirrer system, a mechanical mixer, a rotating drum, a crusher, an extruder, an ultrasound treatment, a vibration, a liquid flow or combinations of these.

In particular, the stirring of the starting material leads to friction and abrasion of the hardened mineral binder and/or the carbonated material. In return, this increases the carbonation rate. Overall, the stirring and/or abrasion leads to improved throughput or to a higher efficiency of the overall disintegration process. The disintegration process thus consists of the combination of (i) a chemical process, i.e. the carbonation that breaks down the hardened mineral binder, and (ii) the removal of the breakdown or carbonation products from the surface of the aggregates. These two processes interact synergistically and considerably accelerate the overall disintegration process.

In particular, these two processes proceed simultaneously and iteratively until a desired degree of disintegration has been attained or until essentially clean aggregates are obtained.

Specifically, the removal of the breakdown or carbonation products from the surface of the aggregates results in stepwise exposure of the unconverted hardened mineral binder present in the lower layers and chemical conversion in the carbonation process. This interplay between chemical and mechanical process is especially very effective and leads to very clean aggregates.

As a result of the breakdown process, the breakdown products are in the form of fine-grain or pulverulent products, the grain sizes of which range from nanometers to several micrometers. Typically, the grain size of the pulverulent comminution product is in the range of 0-0.250 mm or 0-0.125 mm. This fact has several advantages. Firstly, this facilitates the separation of the breakdown products from the cleaned aggregates. Secondly, this means that the fine-grain comminution products can be used, for example, as filler for various industrial applications or as starting material for cement-like materials, without any need for a further mechanical treatment, for example grinding.

This method, which can be regarded as a combined chemical-mechanical process, comprises high efficiency both in respect of the breakdown rate and in respect of the separation of clean aggregates and dissolved hardened mineral binders.

In particular, the starting material is treated in the presence of water. The water may be present, for example, in the form of a gas and/or a liquid.

The treatment of the starting material preferably takes place in a liquid, especially in an aqueous liquid, preferably in water. This means that the starting material is immersed at least partly, especially completely, into the liquid.

However, it is also possible to conduct the treatment with wetted starting material and/or under moist conditions. Moist conditions are especially understood to mean a relative air humidity of 40-100%.

The carbonation is especially effected by a carbon dioxide treatment of the starting material. The carbon dioxide may be a product or by-product of any industrial process. Preference is given to using essentially pure carbon dioxide. The purity of the carbon dioxide is preferably >1% by weight, e.g. >8% by weight, preferably >50% by weight, especially >95% by weight, especially >99% by weight. With regard to the efficiency of treatment, essentially pure carbon dioxide is the most favorable.

It is alternatively possible to use mixtures of carbon dioxide with other substances, such as water vapor, nitrogen and the like, for example air. Such mixtures especially comprise CO2 in an amount of >1% by weight, e.g. >8% by weight, preferably >10% by weight, more preferably >50% by weight, especially >95% by weight, especially >99% by weight. The CO2 concentration used is especially above the CO2 concentration of normal air.

According to the preferred embodiment, it is possible to use off gases from an industrial process and/or a mixture of carbon dioxide with other substances for carbonation. It is advantageous that the offgas or mixture contains about 5-25% by weight of CO2, preferably 8-20% by weight of CO2 or 10-15% by weight of CO2.

The carbon dioxide may be added in gaseous, solid or liquid form.

It is likewise possible to obtain the carbon dioxide used from an in situ breakdown of organic or inorganic substances, especially carbonates, or from the oxidation of carbon monoxide. Suitable carbonates are, for example, carbonate salts, alkene carbonates and the like.

Particular preference is given to carbonating the starting material in a liquid, by adding carbon dioxide in gaseous form to the liquid. The liquid here is especially an aqueous liquid, preferably water. As a result, the carbon dioxide dissolves in the aqueous liquid or water.

The proportion of the solid material, especially of the starting material and/or the carbonic acid-containing material, in the liquid, which is especially water, is preferably about 10-80% by volume, especially 15-75% by volume, especially 20-70% by volume, more preferably 30-65% by volume or 40-60% by volume. If the starting material is subjected to a mechanical force under such conditions, effective abrasion or disintegration of the hardened mineral binder and/or of the carbonated material is induced. In other words, such concentrations lead to highly abrasive conditions.

By contrast, in the case of proportions below 10% by volume of the solid in the liquid, the mechanical force or abrasion is generally much less effective, and the removal of the hardened mineral binder and/or the carbonated material from the surface of the aggregates becomes difficult or even impossible. This is especially attributable to the fact that, under these conditions, the solid in the liquid is deposited quite far removed from the surface of the aggregates. Consequently, usually barely any mechanical contact arises between the solid particles.

In particular, the carbon dioxide is introduced into the liquid in gaseous form, such that bubbles are formed. The bubbles help to remove the carbonation or breakdown products from the surface of the aggregates.

The starting material is advantageously treated with carbon dioxide at atmospheric pressure. However, lower or higher pressures are also possible.

The amount of carbon dioxide required for the treatment depends on the proportion of hardened binder in the starting material. The more hardened binder, the more carbon dioxide is required.

In particular, the treatment takes place at a temperature between $-10\text{-}100°$ C., especially between $-5\text{-}75°$ C. or $5\text{-}40°$ C. However, the treatment can be effected, for example, under moist conditions above 100° C.

In particular, the treatment of the starting material is conducted for as long as new disintegration or carbonation products are formed. What this means more particularly is that the treatment is conducted for as long as significant or measurable amounts of new disintegration or carbonation products are being formed.

More particularly, the treatment in step a) is conducted until an amount of hardened mineral binder and carbonated hardened mineral binder bound to the aggregates is 0.0001-50% by weight, especially 0.001-25% by weight, especially 0.001-10% by weight, preferably 0.01-1% by weight, based on the total weight of the aggregates.

In particular, the treatment in step a) is conducted until a porosity of the treated rock aggregates recovered, measured to standard EN 1097-6, is $\leq 10\%$ by volume, especially $\leq 5\%$ by volume, especially $\leq 2\%$ by volume, preferably 0.1-3% by volume or 1-3% by volume.

In particular, the pulverulent mineral material and the treated aggregates are separated at a characteristic grain size limit. The separating size is preferably between 0.06-1 mm, especially 0.1-0.5 mm, preferably 0.125 mm or 0.250 mm. This means that particles below the grain size limit are collected as pulverulent mineral material, while particles having a size above the grain size limit are collected as aggregates.

The pulverulent mineral material comprises or consists of the pulverulent breakdown product. Optionally, the pulverulent mineral material may comprise small aggregates having a grain size below the grain size limit and/or untreated hardened mineral binder having a grain size below the grain size limit.

The pulverulent mineral material is separated from the treated aggregates especially by filtration, sieving, sedimentation, density separation and/or centrifugation.

The treatment can be effected in a batchwise process or in a continuous process.

According to the preferred execution, the starting material may be immersed, for example, in an aqueous liquid, e.g. water, in a reaction vessel, for example in a concentration of 0.5-5 kg of starting material per liter of liquid, and treated with carbon dioxide by stirring or under abrasive conditions. The carbon dioxide may be introduced into the reaction vessel, for example, via an inlet that permits direct introduction of the carbon dioxide in gaseous form into the aqueous liquid. Thus, the gaseous carbon dioxide is dissolved in water and reacts with the hardened binder under stirring and abrasion conditions in order to produce the breakdown product or pulverulent mineral material. The reaction vessel is preferably stirred and/or comprises a mechanical stirrer for stirring of the reaction mixture and for creation of abrasive conditions. In that case, the pulverulent mineral material is especially separated from the treated aggregates by filtration.

According to the preferred embodiment, the pulverulent mineral material and/or the aggregates obtained are dried after separation. This is advisable especially when the treatment has been conducted under wet conditions or in a liquid.

This can be effected, for example, in an oven, especially at a temperature of 30-150° C., preferably at 80-130° C. or 100-120° C. A further option is also drying with the aid of an air stream, especially a hot air stream, for example with a temperature of 30-150° C. This leads to rapid drying of the pulverulent mineral material and/or the aggregates. However, it is also possible, for example, to dry the products under ambient conditions without further measures. This does not require any additional energy.

The pulverulent mineral material may alternatively be collected as a stable suspension and used in that form. This too does not require any additional energy and enables reduction in the water consumption.

If the treatment has been conducted under wet conditions or in a liquid and the fine material has been separated from the liquid phase, this liquid phase can be reused/recycled for a further treatment according to the present invention.

In a first aspect, the present invention relates to the use of process auxiliaries in a method of obtaining aggregates and/or pulverulent mineral material from a starting material comprising hardened mineral binder and aggregates, wherein the method comprises the following steps:

a) treating the starting material in a disintegration operation, especially under abrasive conditions, wherein the hardened mineral binder is at least partly, especially essentially completely, carbonated and removed from the surface of the aggregates, so as to give a pulverulent disintegration product, b) separating off the treated starting material at a predefined grain size limit in order to obtain treated aggregates having a grain size of at least the predefined grain size limit and/or to obtain pulverulent mineral material having a grain size below the predefined grain size limit.

Process auxiliaries that can be used in the context of the present invention are selected from the group consisting of polycarboxylate ethers and/or esters (PCE), glycols, organic amines, especially alkanolamines, ammonium salts of organic amines with carboxylic acids, surfactants, especially nonionic surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, gluconate, iron sulfate, tin sulfate, antimony salts, alkali metal salts, alkaline earth metal salts, lignosulfonates, glycerol, melamine, melamine sulfonates, water absorbents in the form of a superabsorbent polymer or in the form of a sheet silicate, anticaking agents, sugars, sugar acids, sugar alcohols, phosphates, phosphonates, and mixtures thereof.

In one embodiment of the present invention, process auxiliaries used are organic amines, especially alkanolamines. In this embodiment, the process auxiliary accordingly comprises or consists essentially of alkanolamines. Suitable organic amines are known per se to the person skilled in the art, for example from US 2009/0292041. Alkanolamines are especially preferred in the context of the present invention. Suitable alkanolamines are more preferably selected from the group comprising monoethanolamine, diethanolamine, triethanolamine (TEA), diethanolisopropanolamine (DEIPA), ethanoldiisopropanolamine (EDIPA), isopropanolamine, diisopropanolamine, triisopropanolamine (TIPA), N-methyldiisopropanolamine (MDIPA), N-methyldiethanolamine (MDEA), tetrahydroxyethylethylenediamine (THEED) and tetrahydroxyisopropylethylenediamine (THIPD), and mixtures of two or more of these alkanolamines. It is likewise possible to use salts of these alkanolamines.

Suitable organic amines may also be amines of the general formula

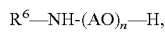

$R^6$—NH-(AO)$_n$—H, where
$R^e$ is a linear, branched or cyclic alkyl group having 1-6 carbon atoms,
AO is an alkylene oxide unit, preferably ethylene oxide and/or propylene oxide, more preferably ethylene oxide,
n=1-55, preferably 1-20.

Further organic amines that may be used in the context of the present invention are ethylenediamine, hexylenediamine, diethylenetriamine, triethylenetetramine, tetraethylenepentamine, isophoronediamine, polyamino alcohols such as aminoethylethanolamine, tetra(hydroxyethyl)ethylenediamine, polyaminocarboxylates such as iminodisuccinic acid, ethylenediaminetetraacetic acid, ethylenediaminesuccinic acid or polyaspartic acid.

In another embodiment of the present invention, process auxiliaries used are glycols and/or glycerol. In this embodiment, the process auxiliary accordingly comprises or consists essentially of glycols and/or glycerol.

Examples of suitable glycols are monoethylene glycol, diethylene glycol, triethylene glycol, tetraethylene glycol, pentaethylene glycol, polyethylene glycol, especially having 6 or more ethylene units, e.g. PEG 200, neopentyl glycol, hexylene glycol, propylene glycol, dipropylene glycol and polypropylene glycol. It is also possible to use mixtures of two or more different glycols and of at least one glycol and glycerol.

In one embodiment, the glycerol is what is called a bioglycerol, which can be produced from a renewable raw material.

It is especially also possible to use mixtures of glycols and alkanolamines as process auxiliary. In this case, these may be added separately to a process of the invention. It is alternatively possible to produce and use premixes. The use of such premixes may be helpful in order to avoid dosage errors.

In a further embodiment of the present invention, lignosulfonate is used as process auxiliary. In this embodiment, the process auxiliary accordingly comprises or consists essentially of lignosulfonate.

The term "lignosulfonate" here means a salt which is composed of lignosulfonate anions and suitable cations, and especially encompasses the substances sodium lignosulfonate (CAS No. 8061-51-6), magnesium lignosulfonate (CAS No. 8061-54-9), calcium lignosulfonate (CAS No. 8061-52-7). The cation is of no importance in respect of efficacy in the present invention.

Lignosulfonates are produced from lignin, which in turn forms in plants, especially woody plants.

Lignin is a three-dimensional amorphous polymer which, by contrast with most other biopolymers, does not have any units in regular arrangement or repeat units. For that reason, it is not possible to specify any defined lignin structure, even though various models for an "average" structure have been proposed. The nonuniformity between the lignin from plants of different taxa, and likewise between the different tissues, cells and cell wall layers of each species, is familiar to the person skilled in the art.

Lignosulfonates form as by-products in cellulose production under the influence of sulfurous acid, which brings about sulfonation and a certain degree of demethylation of the lignins. Like the lignins, they are varied in terms of structure and composition. They are soluble in water throughout the pH range, but insoluble in ethanol, acetone and other standard organic solvents.

Lignosulfonates only have low surface activity. They have only a low tendency to reduce the interfacial tension between liquids, and are unsuitable for reducing the surface tension of water or for formation of micelles. They can function as dispersants through adsorption/desorption and formation of charge on substrates. However, their surface activity can be increased by introducing long-chain alkylamines into the lignin structure.

Methods of isolating and purifying lignosulfonates are familiar to the person skilled in the art. In the Howard method, calcium lignosulfonates are precipitated by addition of an excess of lime to spent sulfite waste liquor. Lignosulfonates can also be isolated by formation of insoluble quaternary ammonium salts with long-chain amines. On an industrial scale, it is possible to use ultrafiltration and ion exchange chromatography for purification of lignosulfonates.

Lignosulfonate ranges usable in accordance with the invention are commercially available under various trade names, for example Ameri-Bond, Borresperse (Borregaard), Dynasperse, Kelig, Lignosol, Marasperse, Norlig (Daishowa Chemicals), Lignosite (Georgia Pacific), Reax (MEAD Westvaco), Wafolin, Wafex, Wargotan, Wanin, Wargonin (Holmens), Vanillex (Nippon Paper), Vanisperse, Vanicell, Ultrazine, Ufoxane (Borregaard), Seria-Bondex, Serla-Con, Serla-Pon, Serla-Sol (Serlachius), Collex, Zewa (Wadhof-Holmes), Raylig (ITT Rayonier).

It is of course also possible to use mixtures of different lignosulfonates; in addition, the lignosulfonates may be present either in liquid or solid form.

In particular, it has now been found that the use of lignosulfonate as process auxiliary in a method of the invention can be used to reduce the floating of charcoal.

The term "charcoal" in the present document is understood to mean a form of carbon that forms on incomplete combustion or thermal cleavage of vaporous carbon-containing substances.

The lignosulfonate may take the form of a pourable composition, for example of a powder, or of a liquid composition, for example of an aqueous composition.

It is advantageous when the amount of lignosulfonate is 0.001%-2.5% by weight, especially between 0.005% and 1.0% by weight, preferably between 0.01% and 0.5% by weight, based in each case on the total mass of the demolition rubble or building waste materials.

In a particularly preferred embodiment of the present invention, the process auxiliary used is at least one polycarboxylate ether and/or polycarboxylate ester (PCE). In this embodiment, the process auxiliary accordingly comprises or consists essentially of at least one PCE.

PCEs of the present invention comprise
(i) repeat units A of general structure (1),

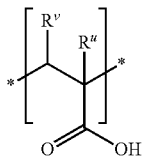
(I)

and
(ii) repeat units B of general structure (II),

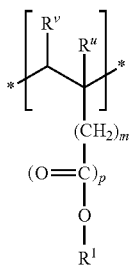
(II)

where
each $R^u$ is independently hydrogen or a methyl group,
each $R^v$ is independently hydrogen or COOM, where M is independently H, an alkali metal, or an alkaline earth metal,
m=0, 1, 2 or 3,
p=0 or 1,
each $R^1$ is independently $-(CH_2)_z-[YO]_n-R^4$ where Y is a C2- to C4-alkylene and $R^4$ is a H, C1- to C20-alkyl, -cyclohexyl, -alkylaryl, or a $-N(-R^i)_j[(CH_2)_z-PO_3M]_{3-j}$, z=0, 1, 2, 3 or 4, n=2-350, j=0, 1 or 2, Ri is a hydrogen atom or an alkyl group having 1-4 carbon atoms, and M is a hydrogen atom, an alkali metal, an alkaline earth metal or an ammonium ion,
and wherein the repeat units A and B in the PCE have a molar ratio A:B within the range from 10:90 to 90:10.

In a preferred embodiment, n=10-250, more preferably 30-200, especially preferably 35-200, in particular 40-110.

In a further preferred embodiment, z=0. In a further preferred embodiment, z=4.

In a particularly preferred embodiment, the PCE comprises repeat units A of general structure (I) and repeat units B of general structure (II), where the molar ratios of A to B are within the range from 20:80-80:20, more preferably 30:70-80:20, in particular 35:65-75:25.

A PCE preferably has an average molar mass $M_w$ in the range of 1000-1 000 000, particularly preferably 1500-500 000, very particularly preferably 2000-100 000, in particular 3000-75 000 or 3000-50 000, g/mol. The molar mass $M_w$ is here determined by gel-permeation chromatography (GPC) with polyethylene glycol (PEG) as standard. This technique is known per se to the person skilled in the art.

PCEs of the invention may be random or nonrandom copolymers. Nonrandom copolymers are in particular alternating copolymers or block or gradient copolymers or mixtures thereof.

PCEs of the invention that are random copolymers can be produced by free-radical polymerization of mixtures comprising at least one olefinically unsaturated carboxylic acid monomer of general structure (Ia)

(Ia)

and at least one olefinically unsaturated monomer of general structure (IIa)

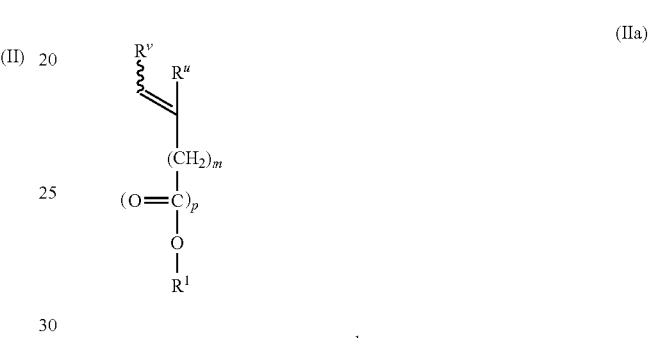
(IIa)

where $R^u$, $R^v$, m, p, and $R^1$ are as defined above and the bond represented by the squiggly line denotes both cis and trans double bond isomers or a mixture thereof.

Suitable conditions for performing free-radical polymerization are known per se to the person skilled in the art and are described for example in EP 1 103 570 (Nippon Shokubai).

PCEs of the invention that are nonrandom copolymers, especially block or gradient copolymers, may preferably be prepared by living free-radical polymerization. The techniques of living free-radical polymerization include nitroxide-mediated polymerization (NMP), atom-transfer radical polymerization (ATRP), and reversible addition-fragmentation chain-transfer polymerization (RAFT). Living free-radical polymerization proceeds essentially in the absence of irreversible transfer or termination reactions. The number of active chain ends is low and remains essentially constant during the polymerization. This is achieved, for example in the case of RAFT polymerization, by the use of a RAFT agent and an only small amount of initiator. This enables essentially simultaneous growth of the chains that continues throughout the polymerization process. This gives rise to the option of using this process to produce block or gradient copolymers, resulting correspondingly in a narrow molecular-weight distribution or polydispersity in the polymer. This is not possible in the case of conventional "free-radical polymerization" or free-radical polymerization carried out in a non-living manner. Particularly advantageously, nonrandom copolymers of the present invention may be produced by means of RAFT polymerization. Advantageous RAFT agents are dithioesters, dithiocarbamate, trithiocarbonate or xanthate. Advantageous initiators are azobisisobutyronitrile (AIBN), α,α'-azodiisobutyramidine dihydrochloride (AAPH) or azobisisobutyramidine (AIBA).

In accordance with a particularly preferred embodiment, the free-radical polymerization is carried out as a solution polymerization, especially in a solvent containing water. It is very particularly preferable to carry out the polymerization in pure water. It is preferable to run the free-radical polymerization for producing PCEs of the invention up to a conversion of at least 75%, preferably at least 80%, more preferably at least 90%, even more preferably at least 95%, in particular at least 98% or more, in each case based on the total molar amount of monomers present.

PCEs of the invention can also be produced by a polymer-analogous reaction. In particular, PCEs of the invention can be produced by the esterification of a homo- or copolymer comprising repeat units of general structure (I) with polyalkylene glycols of general structure (III)

$$HO—R^1 \quad (III)$$

where $R^1$ is as defined above.

Processes suitable for producing PCEs of the invention by esterification are known per se to the person skilled in the art and are described for example in EP 1138697 (Sika AG).

In addition to the at least one olefinically unsaturated carboxylic acid monomer of general structure (Ia) and the at least one olefinically unsaturated macromonomer of general structure (IIa), PCEs of the invention may comprise one or more further monomers M. These further monomers M may be selected from styrene, ethylene, propylene, butylene, butadiene, isoprene, vinyl acetate, vinyl chloride, acrylonitrile, N-vinylpyrrolidone and/or hydroxyalkyl (meth)acrylates.

It is preferable that the molar proportion of the one or more further monomers M is not more than 66 mol %, preferably not more than 50 mol %, more preferably not more than 25 mol %, especially preferably not more than 10 mol %, in particular not more than 5 mol %, based in each case on all monomers giving rise to the PCE. In a very particularly preferred embodiment, the PCE is essentially free of further monomer units M. Accordingly, a PCE of the invention consists to an extent of at least 34 mol %, preferably at least 50 mol %, more preferably at least 75 mol %, especially preferably at least 90 mol %, in particular 100 mol %, of the repeat units A and B.

In a very particularly preferred embodiment, the PCE of the present invention accordingly consists of
(i) repeat units A of general structure (1),

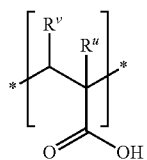

and
(ii) repeat units B of general structure (11),

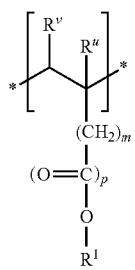

where
each $R^u$ is independently hydrogen or a methyl group,
each $R^v$ is independently hydrogen or COOM, where M is independently H, an alkali metal, or an alkaline earth metal,
m=0, 1, 2 or 3,
p=0 or 1,
each $R^1$ is independently —$(CH_2)_z$—$[YO]_n$—$R^4$ where Y is a C2 to C4 alkylene and $R^4$ is H, C1 to C20 alkyl, cyclohexyl or alkylaryl,
z=0, 1, 2, 3 or 4, n=2-350,
and wherein the repeat units A and B in the PCE have a molar ratio A:B within the range from 10:90 to 90:10.

PCEs of the present invention may be in solid form, especially in powder form. PCEs of the present invention may alternatively be in liquid form. Suitable liquid forms are melts of the PCEs of the invention, or aqueous compositions, such as aqueous solutions or aqueous dispersions of the PCEs.

Aqueous compositions are produced by adding water in the course of production of the PCE or by subsequent blending of PCEs with water.

Typically, the proportion of the PCE is 10% to 90% by weight, especially 25% to 50% by weight, based on the weight of the aqueous composition.

According to the type of PCE, a dispersion or solution is formed. Preference is given to a solution.

The aqueous composition may comprise further constituents. Examples of these are solvents or additives as familiar in concrete technology, especially surface-active substances, stabilizers against heat and light, dyes, defoamers, accelerators, retardants, corrosion inhibitors, air pore formers.

In one embodiment of the invention, one PCE is used. It is alternatively possible, and preferable in some cases, to use a mixture of multiple chemically different PCEs.

In one embodiment, PCEs are used in a process of the invention which is conducted in a liquid, especially in water. Without the addition of PCEs in such a process, thickening of the suspension is frequently observed during the disintegration and carbonation. The use of PCEs in such a process can prevent or distinctly reduce this thickening.

In a further embodiment, a PCE is used in combination with at least one further process auxiliary. Particularly preferred further process auxiliaries are glycols, organic amines, especially alkanolamines, ammonium salts of organic amines with carboxylic acids, surfactants, especially nonionic surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, sorbitol, saccharides, gluconate, iron sulfate, tin sulfate, antimony salts, alkali metal salts, alkaline earth metal salts, lignosulfonate, glycerol, melamine, melamine sulfonate, water absorbents in the form of a superabsorbent polymer or in the form of a sheet silicate, anticaking agents, sugars, sugar acids, sugar alcohols, phosphates, phosphonates.

Glycols, organic amines, especially alkanolamines, and lignosulfonates are as defined above.

The carboxylic acid is preferably selected from formic acid, acetic acid, propionic acid, lactic acid, citric acid or tartaric acid.

The alkali metal or alkaline earth metal salt is preferably selected from alkali metal or alkaline earth metal halide, alkali metal or alkaline earth metal hydroxide, alkali metal or alkaline earth metal nitrate, alkali metal or alkaline earth metal nitrite, and alkali metal or alkaline earth metal thiocyanate. Examples of alkali metal and alkaline earth metal halides are alkali metal and alkaline earth metal chlorides, alkali metal and alkaline earth metal fluorides, alkali metal and alkaline earth metal bromides, and alkali metal and alkaline earth metal iodides. Examples of suitable alkali metals and alkaline earth metals for these salts are Li, Na, K, Mg and Ca. Specific examples are calcium chloride, sodium chloride, sodium thiocyanate and sodium carbonate.

Boric acid and salts thereof, salts of phosphoric acid, saccharides, sorbitol and gluconates are also known as retardants. The saccharides or carbohydrates may be polysaccharides and oligosaccharides or sugars. One example of a gluconate is sodium gluconate.

Iron sulfate, tin sulfate and antimony salts are also known as chromate(VI)-reducing substances in cements.

If a PCE is used in combination with at least one further process auxiliary, it is possible to dose in the different process auxiliaries separately from one another. It is alternatively possible to produce and add premixes of the different process auxiliaries. In this way, it is possible to minimize dosage errors. In a particularly preferred embodiment, the at least one process auxiliary is added to an aqueous PCE composition as described above. What is thus used is an aqueous composition comprising at least one PCE and the one or more further process auxiliary/auxiliaries.

The dosage is preferably effected in such a way that the at least one PCE is present to an extent of 0.001-2.5% by weight, especially between 0.005% and 1.0% by weight, preferably between 0.01% and 0.5% by weight, based on the demolition rubble or building waste material used.

In addition, it may be advantageous when the at least one PCE is used in the form of a composition comprising at least one additive, for example a grinding additive, a concrete admixture and/or a mortar admixture. The at least one additive is especially selected from the group consisting of plasticizers that are not PCEs, grinding aids, chrome reducers, defoamers, dyes, pigments, preservatives, retardants, accelerators, air pore formers, shrinkage reducers, corrosion inhibitors or mixtures thereof.

Such a composition includes or preferably consists of
a) 5%-99% by weight, preferably 5-50, further preferably 5%-30% by weight % by weight, of PCEs;
b) 1%-80% by weight, preferably 5%-60% by weight, further preferably 5%-30% by weight, of at least one further process auxiliary;
c) 0%-90% by weight, especially 1%-20% by weight, of at least one further additive;
d) 0%-90% by weight, especially 10%-60% by weight, of water,
based in each case on the total weight of the composition.

In particular, it may be advantageous to use the at least one PCE in a composition comprising a polyalkylene glycol. The polyalkylene glycol here is a compound of the general formula (III) or a compound of the general formula (II) in which p=0. Preferably, the polyalkylene glycol has a molar mass Mw of 1000-50 000 g/mol, preferably 4000 to 6000 g/mol. In a particularly preferred embodiment, the polyalkylene glycol is a polyethylene glycol (PEG), methoxy polyethylene glycol (MPEG) or a polypropylene glycol (PPG). Particular preference is given to polyethylene glycol (PEG) or methoxy polyethylene glycol (MPEG). Such mixtures are particularly suitable for extending the processing time of hydraulically setting compositions and improving flow characteristics.

In a further embodiment of the present invention, at least one surfactant is used as process auxiliary. In this embodiment, the process auxiliary accordingly comprises or consists essentially of at least one surfactant.

Surfactants are well known per se to the person skilled in the art and are summarized, for example, in "Surfactants and Polymers in aqueous solutions" (Wiley-VCH, K. Holmberg et al, 2nd edition, 2007). Surfactants may be nonionic surfactants, cationic surfactants, anionic surfactants or zwitterionic surfactants. It may especially be advantageous to use nonionic surfactants since these have a low tendency to absorption on cement phases.

Such nonionic surfactants having a low tendency to absorption on cement phases are particularly preferred in particular applications. It is alternatively possible to use cationic, anionic or zwitterionic surfactants.

Suitable surfactants in the context of the present invention are, for example, lipids such as cholates, glycocholates, fatty acid salts, glycerides, glycolipids and phospholipids. These may come from natural sources or have been produced synthetically. Nonionic lipids are preferred in particular embodiments.

Suitable anionic surfactants are especially alkyl ether carboxylates, alkyl sulfates, alkyl ether sulfates, alkyl sulfosuccinates, alkyl phosphates, alkyl ether phosphonates and alkylbenzenesulfonates.

Suitable nonionic surfactants are especially fatty acid alkoxylates, alkoxylated alcohols, especially fatty acid alcohol alkoxylates, and alkoxylates of glycerol and pentaerythritol, alkylphenol alkoxylates, alkoxylated polysaccharides, alkoxylated polycondensates, fatty acid amide alkoxylates, esters of fatty acids, especially fatty acid esters of methanol, sorbitan, glycerol or pentaerythritol, alkoxylated alkylamines having an alkyl radical consisting of 6-20 carbon atoms, alkyl glycosides, alkyl glucamides, esters of fatty acids and sugars, and alkoxylated sorbitans, copolymers of ethylene oxide and propylene oxide, lauryl ether sulfonates, naphthalenesulfonates, hydrophobized starch, hydrophobized cellulose and siloxane-based surfactants. Preferred alkoxylates in this connection are particularly ethoxylates.

Suitable cationic surfactants especially contain ammonium groups or quaternary nitrogen atoms and additionally have at least one long-chain alkyl radical. Examples of cationic surfactants are betaines, amido betaines, imidazolines and amine N-oxides.

In very particularly preferred embodiments, at least one surfactant is used in combination with at least one further process auxiliary, especially at least one PCE, a lignosulfonate, an alkanolamine, an alkali metal salt, an alkaline earth metal salt, or a water absorbent.

Nonionic surfactants that are very particularly preferred in the context of the present invention are compounds of the general formula (IV)

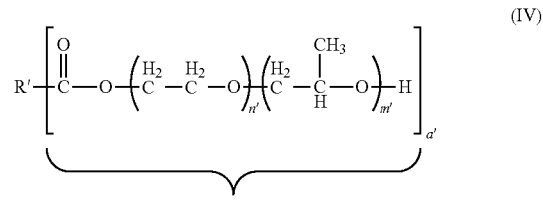

Polyoxyalkylene radical A' where
R' is an a'-valent, linear or branched, saturated or mono- or polyunsaturated aliphatic, cycloaliphatic or aromatic hydrocarbyl radical having 3 to 38 carbon atoms, preferably having 5 to 17 carbon atoms, where the hydrocarbyl chain is substituted by a' polyoxyalkylene radicals A', preferably terminally (i.e. at one or both ends of the linear hydrocarbyl chain) in the case of linear hydrocarbyl chains, with "substituted" in the present context meaning that one hydrogen atom of the hydrocarbyl radical R' in each case is replaced by a polyoxyalkylene radical A', R' preferably being a linear or branched, saturated or mono- or polyunsaturated aliphatic hydrocarbon radical having 3 to 38 carbon atoms, preferably having 5 to 17 carbon atoms, where the hydrocarbyl chain is terminally substituted by 1 or 2 (a=1 or 2), preferably by 1, polyoxyalkylene radical(s) A', more preferably, R' is a linear saturated or unsaturated aliphatic hydrocarbon radical having 5 to 17 carbon atoms, where the hydrocarbyl chain is terminally substituted by one polyoxyalkylene radical A' (a'=1), a'=1 to 4, preferably less than 3, further preferably 1 to 2, especially preferably 1, n'=0 to 40, preferably 2 to 30, especially preferably 4 to 20, m'=0 to 40, preferably 2 to 30, especially preferably 4 to 20, with the proviso that the sum total of n' and m'=4 to 80, preferably from 6 to 40, especially preferably 8 to 20, where the units identified by n' and m' are distributed either in blocks or randomly in the polyether chain, and the units identified by n' and m' are the averages of the possible statistical distribution of the structures actually present.

Alkoxylated polycondensates in the context of the present invention are especially polycondensation products that are obtained from a condensation of the compounds A, B that follow, and at least one aldehyde of the general formula C.

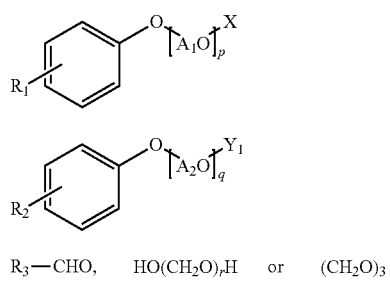

(A)

(B)

$R_3$—CHO,    $HO(CH_2O)_rH$    or    $(CH_2O)_3$    (C)

where $R_1$ is hydrogen, an alkyl group having 1-24 carbon atoms or an alkenyl group having 2-24 carbon atoms, $A_1O$ and $A_2O$ are independently an alkylene oxide group having 2-4 carbon atoms, p and q are independently a number from 1 to 300, X is a hydrogen atom, an alkyl group having 1-10 carbon atoms or an acyl group having 2-24 carbon atoms, $R_2$ is an alkyl group having 4-24 carbon atoms or an alkenyl group having 4-24 carbon atoms, $Y_1$ is a phosphonate or phosphate group, $R_3$ is a hydrogen atom, a carboxyl group, an alkyl group having 1-10 carbon atoms, an alkenyl group having 2-10 carbon atoms, a phenyl group, a naphthyl group, or a heterocycle, and r is a number between 1-100.

Depending on the application, nonionic surfactants can also reduce the shrinkage of hydraulic compositions.

In a further embodiment of the present invention, at least one gemini surfactant is used as process auxiliary. In this embodiment, the process auxiliary accordingly comprises or consists essentially of a gemini surfactant.

Gemini surfactants contain two hydrophilic head groups and two hydrophobic tails that are separated by a spacer at the head groups or in the vicinity thereof. If both the hydrophobic tails are the same and the hydrophilic groups are identical, gemini surfactants are said to have a symmetric structure. The substituents in gemini surfactants are responsible to a high degree for the behavior of these compounds in solution and their possible applications. In particular, gemini surfactants may contain quaternary nitrogen atoms that are generally in acyclic forms. However, there are also gemini surfactants that contain nitrogen in saturated and unsaturated rings. The spacer may either be rigid or flexible, and has a tendency to hydrophobicity or hydrophilicity. The particular properties of gemini surfactants may be influenced by optimization of the hydrophilic-lipophilic balance (HLB value). This can be effected, for example, by the introduction of balanced polar or hydrophobic groups and in head groups, in tails or in spacers.

Examples of gemini surfactants are structures of the following formulae:

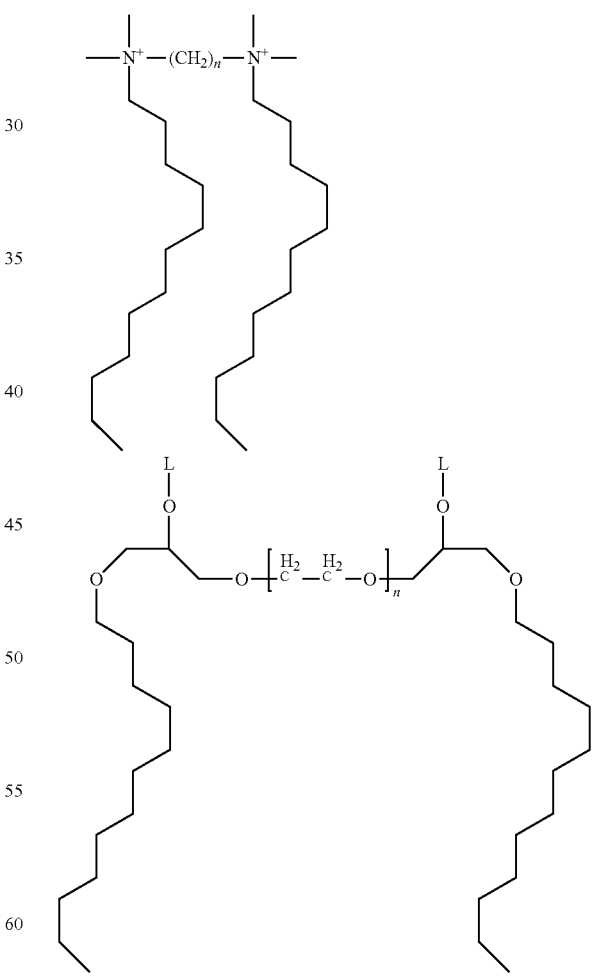

where L is a hydrogen atom or a sulfonic acid group.

Examples of preferred gemini surfactants in the present context are especially alkoxylated acetyl diols or gemini surfactants as described in EP0884298.

In a further embodiment of the present invention, at least one alkoxylated phosphonic or phosphoric ester is used as process auxiliary. In this embodiment, the process auxiliary accordingly comprises or consists essentially of at least one alkoxylated phosphonic or phosphoric ester. Such alkoxylated phosphonic or phosphoric esters are particularly advantageous when pulverulent mineral materials are to be used by a method of the invention in hydraulic compositions comprising fly ashes. Such alkoxylated phosphonic or phosphoric esters are alternatively advantageous in applications for ash improvement technology.

Suitable alkoxylated phosphonic or phosphoric esters are structures of the general formula (v)

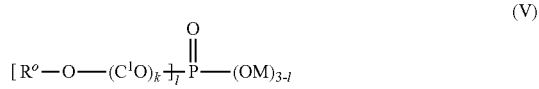

(V)

where
R° is a hydrogen atom, an alkyl group having 1-5 carbon atoms, an alkenyl group having 2-5 carbon atoms or a (meth)acryloyl group,
$C^1O$ is an alkylene oxide group having 2-4 carbon atoms,
k is a number between 2-150, l is a number between 1-3, and
M is a hydrogen atom, an alkali metal, an alkaline earth metal, an ammonium group or an organic ammonium group.

It is especially also possible to combine an alkoxylated phosphonic or phosphoric ester of the general structure (V) with a polyalkylene glycol, a PCE as described above, or a lignosulfonate as described above.

In a further embodiment of the present invention, at least one water absorbent is used as process auxiliary. In this embodiment, the process auxiliary accordingly comprises or consists essentially of at least one water absorbent. The water absorbent according to the present invention is especially a water absorbent in the form of a superabsorbent polymer or in the form of a sheet silicate, particular preference being given to sheet silicates in the form of vermiculite.

The term "superabsorbent polymers" means polymers that can absorb large amounts of water. If superabsorbent polymers come into contact with water, the water molecules diffuse into the cavities of the polymer network and hydrate the polymer chains. The polymer can thus swell and form a polymer gel or dissolve gradually. This step is reversible, such that the superabsorbent polymers are able to be regenerated into their solid state by removal of the water. The property of water absorption is identified by the swell ratio, which means the ratio of the weight of a swollen superabsorbent polymer to its weight in the dry state. The swell ratio is influenced by the level of branching of the superabsorbent polymer, any crosslinking present, the chemical structure of the monomers that form the superabsorbent polymer network, and external factors, such as pH, the ion concentration of the solution and the temperature. Owing to their property of interacting with water, superabsorbent polymers are also referred to as hydrogels.

Examples of superabsorbent polymers usable in the context of the present invention include natural polymers, such as starch, cellulose, such as cellulose ethers, chitosan or collagen, alginates, synthetic polymers, such as poly(hydroxyethyl methacrylate), poly(ethylene glycol) or poly (ethylene oxide), or ionic synthetic polymers, such as polyacrylic acid (PAA), polymethacrylic acid (PMAA), polyacrylamides (PAM), polylactic acid (PLA), polyethyleneimine, polyvinylalcohol (PVA) or polyvinylpyrrolidone.

Superabsorbent polymers that are produced from ionic monomers normally absorb more water than those that are prepared from uncharged monomers, the reason for which is the electrostatic repulsion between the individual polymer chains. The level of crosslinking corresponds to the number of chemical compounds. The higher the level of crosslinking and the higher the proportion of the crosslinking agents, the shorter the distance between two crosslinking sites, which leads to a reduction in the level of swelling. The level of swelling alternatively depends on external factors such as pH and temperature. Superabsorbent polymers that are formed from acidic monomers such as acrylic acid or methacrylic acid can be deprotonated at pH values above 7, such that negative charges are created in the polymer chains. The associated electrostatic repulsion leads to a higher degree of swelling in alkaline media. Superabsorbent polymers that are particularly suitable in the context of the present invention are ionic superabsorbent polymers, especially those that are based on polyacrylamide modified with acrylic acid and may be either of linear or crosslinked structure.

A second class of water absorbents that may be used with particular benefits in the context of the process of the invention is that of sheet silicates, especially in the form of vermiculite. The term "vermiculite" refers to a sheet silicate present in the monoclinic crystal system with the general chemical composition $Mg_{0.7}(Mg, Fe, Al)_6(SiAl)_8O_{20}(OH)_4 \cdot 8H_2O$. Vermiculite develops lamellar, flaky or bulky aggregates that are either colorless or are colored gray-white, yellow-brown, gray-green or green as a result of added extraneous matter.

The amount of the water absorbent that leads to particularly favorable results in the method of the invention depends essentially on the absorption capacity of the material used for water. For instance, superabsorbent polymers generally have greater water absorption than sheet silicates, and so a small amount of a superabsorbent polymer is sufficient to achieve an effect comparable to a particular amount of sheet silicate. The superabsorbent polymer in the context of the method of the invention may appropriately be added in an amount of 0.04% to 2.5% by weight, preferably 0.08% to 1.0% by weight and most preferably 0.1% to 0.5% by weight, based on the total weight of the construction rubble or building waste materials. In the case of sheet silicates, by contrast, advisable amounts are in the range from 2% to 30% by weight, preferably in the range from 4% to 15% by weight, and most preferably in the range from 6% to 10% by weight.

The water absorbents are especially suitable for controlling process moisture in a method of the invention. As a result, it is possible to consume the moisture that arises in the chemical process. As a result, it is also possible to remove excess water present, for example, when moist or wet starting material is used. This is desirable particularly when the method of the invention is to be run within a narrow moisture range.

In a further embodiment of the present invention, at least one carboxylic acid is used as process auxiliary. In this embodiment, the process auxiliary accordingly comprises or consists essentially of at least one carboxylic acid. The carboxylic acid is preferably selected from formic acid, acetic acid, propionic acid, glycolic acid, lactic acid, malic acid, citric acid, isocitric acid, tartaric acid, oxalic acid, tartronic acid, mandelic acid, salicylic acid, fatty acids having 6-20 carbon atoms, especially stearic acid, or salts thereof.

In a particular embodiment, stearic acid or salts thereof are used as process auxiliary. In this embodiment, the process auxiliary accordingly comprises or consists essentially of stearic acid and/or salts thereof. The use of stearic acid and/or salts thereof, especially calcium stearate, as process auxiliary leads to hydrophobization of the surface of the aggregates and/or pulverulent mineral materials obtained.

In one embodiment of the present invention, alkali metal and/or alkaline earth metal salts are used as process auxiliary. In this embodiment, the process auxiliary accordingly comprises or consists essentially of alkali metal and/or alkaline earth metal salts.

The alkali metal or alkaline earth metal salt is preferably selected from alkali metal or alkaline earth metal halide, alkali metal or alkaline earth metal hydroxide, alkali metal or alkaline earth metal nitrate, alkali metal or alkaline earth metal nitrite, alkali metal or alkaline earth metal thiocyanate, alkali metal or alkaline earth metal carbonate, alkali metal or alkaline earth metal hydrogen carbonate, alkali metal or alkaline earth metal sulfate, alkali metal or alkaline earth metal thiosulfate, alkali metal or alkaline earth metal silicate, alkali metal or alkaline earth metal aluminate. Examples of alkali metal and alkaline earth metal halides are alkali metal and alkaline earth metal chlorides, alkali metal and alkaline earth metal fluorides, alkali metal and alkaline earth metal bromides, and alkali metal and alkaline earth metal iodides. Examples of suitable alkali metals and alkaline earth metals for these salts are Li, Na, K, Mg and Ca.

In one embodiment of the present invention, anticaking agents are used as process auxiliary. In this embodiment, the process auxiliary accordingly comprises or consists essentially of anticaking agents. Anticaking agents that may be used in the context of the present invention are selected from the group consisting of tricalcium phosphate, cellulose, magnesium stearate, sodium hydrogencarbonate, sodium hexacyanoferrate, potassium hexacyanoferrate, calcium hexacyanoferrate, calcium phosphate, sodium silicate, silicon dioxide, especially fumed silica, calcium silicate, magnesium trisilicate, talc, sodium aluminosilicate, potassium aluminosilicate, calcium aluminosilicate, bentonite, aluminum silicate, stearic acid, polydimethylsiloxane, sodium laurate.

In one embodiment of the present invention, sugars, sugar acids or sugar alcohols are used as process auxiliary. In this embodiment, the process auxiliary accordingly comprises or consists essentially of sugars, sugar acids or sugar alcohols.

A "sugar" in the context of the present invention is a carbohydrate having an aldehyde group. In particularly preferred embodiments, the sugar belongs to the group of the monosaccharides or disaccharides. Examples of sugars include glyceraldehyde, threose, erythrose, xylose, lyxose, ribose, arabinose, allose, altrose, glucose, mannose, gulose, idose, galactose, tallose, fructose, sorbose, lactose, maltose, sucrose, lactulose, trehalose, cellobiose, chitobiose, isomaltose, palatinose, mannobiose, raffinose and xylobiose.

A "sugar acid" in the context of the present invention is a monosaccharide having a carboxyl group. It may belong to any of the classes of the aldonic acids, urosonic acids, uronic acids or aldaric acids. It is preferably an aldonic acid. Examples of sugar acids that are useful in connection with the present invention include glyceric acid, xylonic acid, gluconic acid, ascorbic acid, neuramic acid, glucuronic acid, galacturonic acid, iduronic acid, tartaric acid, mucic acid and saccharic acid. The sugar acid may take the form of the free acid or a salt. According to the embodiment, salts of sugar acids may be salts with metals of groups Ia, IIa, Ib, IIb, IVb, VIIIb of the Periodic Table of the Elements. Preferred salts of sugar acids are salts of alkali metals and alkaline earth metals, iron, cobalt, copper or zinc. Particular preference is given to salts with monovalent metals such as lithium, sodium and potassium.

A "sugar alcohol" in the context of the present invention is a polyhydric alcohol that can be obtained by a redox reaction from sugars. Sugar alcohols thus belong to the class of the alditols. Examples of sugar alcohols include ethylene glycol, glycerol, diglycerol, threitol, erythritol, pentaerythritol, dipentaerythritol, xylitol, ribitol, arabitol, sorbitol, sorbitan, isosorbide, mannitol, dulcitol, fucitol, iditol, inositol, volemitol, lactitol, maltitol, isomalt, maltotriitol, maltotetraitol and polyglycitol.

In a further embodiment of the present invention, phosphates or phosphonates are used as process auxiliary. In this embodiment, the process auxiliary accordingly comprises or consists essentially of phosphates or phosphonates.

A "phosphate" in the context of the present invention is a derivative of phosphoric acid. A phosphate may be free phosphoric acid, an oligomer of phosphoric acid and/or a polymer of phosphoric acid, for example diphosphate, triphosphate, tetraphosphate and the like. Phosphates may be in a protonated, partly deprotonated or fully deprotonated state. They may also be fluorinated. Examples of suitable phosphates are trisodium orthophosphate, tetrasodium pyrophosphate, sodium hexametaphosphate and disodium fluorophosphate. It is likewise possible that a "phosphate" relates to an ester of phosphoric acid or to an ester of one of its oligomers. The esters of phosphoric acids include mixed esters with the abovementioned carboxylic acids and/or sugar acids, mixed esters with carboxylic acids, especially with fatty acids, alkyl esters, aryl esters, and esters with polyalkylene glycols.

The term "phosphonate" likewise relates to mono-, di-, tri-, tetra-, penta- or hexaphosphonic acids, and the oligomers and/or esters thereof. Phosphonates preferably bear organofunctional units. Phosphonates may be in the protonated, partly deprotonated or fully deprotonated state. Examples of suitable phosphonates are 1-hydroxyethylidene-1,1-diphosphonic acid, 2-phosphonobutane-1,2,4-tricarboxylic acid, 3-aminopropylphosphonic acid, aminotri(methylenephosphonic acid) and diethylenetriaminepenta(methylenephosphonic acid).

It is of course possible and in some cases also desirable that two or more of the process chemicals of the invention are used in a method as described above.

In particular, it is possible to use PCEs in combination with glycerol, glycol and/or alkanolamines. In addition, it is possible to use PCEs in combination with a water absorbent. Furthermore, it is possible to use PCEs in combination with a nonionic surfactant and/or a gemini surfactant.

An advantageous combination may also be at least one alkanolamine, optionally at least one glycol and at least one nonionic surfactant and/or gemini surfactant.

The process auxiliaries may optionally comprise further constituents. Examples of these are solvents or additives as familiar in concrete technology, especially stabilizers against heat and light, chromium reducers, defoamers, dyes, pigments, preservatives, air pore formers, shrinkage reducers, corrosion inhibitors.

In a method of obtaining aggregates and/or pulverulent mineral material from a starting material comprising hardened mineral binder and aggregates, wherein the method comprises the following steps:
  a) treating the starting material in a disintegration operation, especially under abrasive conditions, wherein the hardened mineral binder is at least partly, especially essentially completely, carbonated and removed from the surface of the aggregates, so as to give a pulverulent disintegration product,
  b) separating off the treated starting material at a predefined grain size limit in order to obtain treated aggregates having a grain size of at least the predefined grain size limit and/or to obtain pulverulent mineral material having a grain size below the predefined grain size limit,
  the one or more process auxiliaries selected from the group consisting of polycarboxylate ethers and/or esters (PCE), glycols, organic amines, especially alkanolamines, ammonium salts of organic amines with carboxylic acids, surfactants, especially nonionic surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, gluconate, iron sulfate, tin sulfate, antimony salts, alkali metal salts, alkaline earth metal salts, lignosulfonates, glycerol, melamine, melamine sulfonates, water absorbents in the form of a superabsorbent polymer or in the form of a sheet silicate, anticaking agents, sugars, sugar acids, sugar alcohols, phosphates, phosphonates, may be added.

In a further aspect, the present invention therefore relates to a method of obtaining aggregates and/or pulverulent mineral material from a starting material comprising hardened mineral binder and aggregates, wherein the method comprises the following steps:
  a) treating the starting material in a disintegration operation, especially under abrasive conditions, wherein the hardened mineral binder is at least partly, especially essentially completely, carbonated and removed from the surface of the aggregates, so as to give a pulverulent disintegration product,
  b) separating off the treated starting material at a predefined grain size limit in order to obtain treated aggregates having a grain size of at least the predefined grain size limit and/or to obtain pulverulent mineral material having a grain size below the predefined grain size limit,
  characterized in that at least one process auxiliary selected from the group consisting of polycarboxylate ethers and/or esters (PCE), glycols, organic amines, especially alkanolamines, ammonium salts of organic amines with carboxylic acids, surfactants, especially nonionic surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, gluconate, iron sulfate, tin sulfate, antimony salts, alkali metal salts, alkaline earth metal salts, lignosulfonates, glycerol, melamine, melamine sulfonates, water absorbents in the form of a superabsorbent polymer or in the form of a sheet silicate, anticaking agents, sugars, sugar acids, sugar alcohols, phosphates, phosphonates,
  is added.

The sequence and juncture of addition of the at least one process auxiliary is not particularly restricted here. It is especially possible that one or more process auxiliaries are added to the starting material, preferably before the disintegration operation a). It is alternatively possible to add the one or more process auxiliaries during the process, for example during the disintegration operation a) and/or during the separation step b). It is additionally possible to add the one or more process auxiliaries after the separation step b), if appropriate only to a partial fraction of the aggregates and/or pulverulent mineral materials obtained. The latter may be advantageous especially when the process auxiliary/auxiliaries is/are added in order to influence the behavior of the aggregates and/or pulverulent mineral materials obtained on use for production of hydraulic compositions, especially cement-bound building materials.

The one or more process auxiliaries may be used in neat form or as solutions or as dispersions. It is especially possible in the context of the present invention to use the one or more process auxiliaries in powder form. This may be advantageous particularly when the one or more process auxiliaries are mixed with the starting material, especially demolition material and/or building waste. It is alternatively possible to use the one or more process auxiliaries in aqueous solution or dispersion. This may be advantageous especially when the one or more process auxiliaries are added during the disintegration step.

In a method of the invention, it is accordingly possible that a process auxiliary is added. In a method of the invention, it is alternatively possible, and preferable in many cases, that a mixture of two or more process auxiliaries is added.

If a mixture of two or more process auxiliaries is added, this mixture may be and may be added in the form of a premix, especially an aqueous solution or dispersion. It is alternatively possible that two or more process auxiliaries are added separately from one another. This is advantageous especially when the different process auxiliaries cannot take the form of a stable mixture, for example since they would react chemically. It is also possible to add different process auxiliaries to different method steps.

Means of addition and mixing-in are known per se to the person skilled in the art.

In particular, in a method of the present invention, the carbonation is continued in step a) until a pH of the mixture of 7-10, preferably 7-9, is attained.

A further aspect of the present invention relates to the aggregates and/or pulverulent mineral materials obtainable by the method of the present invention. These aggregates and/or pulverulent mineral materials are especially in particle form. These aggregates and/or pulverulent mineral materials differ from fresh or clean rock aggregates especially in that they may bear a minimal amount of hardened residual binder on the surface and contain the process auxiliaries used in free, bound, converted or adsorbed form. Fresh or clean rock aggregates in the present connection are rock aggregates that have especially never come into contact with mineral binder, especially with cementitious material.

Typically, the aggregates and/or pulverulent mineral materials comprise hardened mineral binder in an amount of 0.0001-25% by weight, preferably 0.01-10% by weight, especially 0.01-1% by weight, based on the total weight of the rock aggregates.

In particular, a porosity, measured to standard EN 1097-6, of the aggregates and/or pulverulent mineral materials is ≤10% by volume, especially ≤5% by volume, especially ≤2% by volume. The porosity is typically ≥0.1% by volume, especially ≥1% by volume. The porosity is preferably 1.5 2% by volume.

The aggregates preferably have a particle size of at least 125 μm or at least 250 μm.

In particular, the pulverulent mineral material has a particle size below 250 μm, preferably below 125 μm. A fineness of the pulverulent mineral material is especially in the range of 0.5-1000 m2/g, preferably 0.5-500 m2/g, especially 0.5-100 m2/g. The fineness relates to the surface area calculated based on nitrogen sorption (BET).

In particular, the pulverulent mineral material comprises or consists of carbonate-containing hydrates of the cement-bound hardened binder, optionally with residual hydrates and/or oxides, e.g. quartz. There may optionally also be aluminate products and/or sulfates.

In particular, the pulverulent mineral material has the same oxide composition as the hardened binder and as fractions of aggregates having a grain size below the grain size limit, for example below 250 μm or below 125 μm.

Such pulverulent mineral materials having grain sizes in the nano- to micrometer range and/or a high specific surface area are particularly advantageous when they are used as filler and/or supplementary cementitious material and/or raw material for cement production and/or ash improvement technology. The fineness of the pulverulent building material can especially increase the speed of early hydration of hydraulic compositions, especially cement-bound building materials. Moreover, there is no need to grind such materials for use in binder compositions. It is thus possible to mix the pulverulent mineral materials obtained with cement, for example easily and without additional complexity.

The rock aggregates and/or pulverulent mineral materials obtainable by the method of the invention can advantageously be used for production of binder compositions, especially hydraulically setting compositions such as cement-bound building materials and very particularly of mortar and/or concrete compositions.

The pulverulent mineral material obtainable by the process of the present invention may preferably be used as filler and/or supplementary cementitious material, especially for production of hydraulically setting compositions, especially mortar and/or concrete compositions.

In a further aspect, the present invention therefore relates to the use of aggregates and/or pulverulent mineral material obtained in a method as described above for production of hydraulic compositions, preferably cement-bound building materials, especially mortar or concrete.

A further aspect of the present invention relates to a method of producing hydraulically setting compositions, especially mortar or concrete compositions, comprising the steps of (i) obtaining aggregates and/or pulverulent mineral material by the above-defined method using process auxiliaries, and (ii) mixing the aggregates and/or pulverulent mineral materials obtained with mineral binder, especially hydraulic binder, and optionally further admixtures and/or water.

When there is no addition of water in the abovementioned methods, it is possible, for example, to produce dry mortars or concrete compositions.

In the case of additional addition of water, it is possible to produce processable hydraulically setting compositions, for example mortar or concrete compositions. The ratio of water to binder in the compositions may be chosen within the range of 0.2-0.8, especially 0.3-0.6, preferably 0.3-0.5.

In a last aspect, the present invention therefore relates to a mortar or concrete comprising at least one aggregate and/or pulverulent mineral material obtained in a method as described above.

EXAMPLES

Table 1 below gives an overview of the raw materials used in the examples.

TABLE 1

| | Raw materials used |
|---|---|
| Binder A | CEM I 42.5 R (Vigier) |
| Binder B | CEM II/A-LL (Vigier) |
| PCE-1 | Co(poly-acrylate-poly-methacrylate) with Mn = 5000 g/mol and methoxy-terminated polyethylene oxide side chains (Mn = 3000 g/mol); molar ratio of carboxylate:side chain = 4.5 |
| PCE-2 | Co(poly-acrylate-poly-methacrylate) with Mn = 5000 g/mol and methoxy-terminated polyethylene oxide side chains (Mn = 1000 g/mol); molar ratio of carboxylate:side chain = 0.8 |
| PCE-3 | Co(poly-acrylate-poly-methacrylate) with Mn = 5000 g/mol and methoxy-terminated polyethylene oxide side chains (Mn = 500 g/mol); molar ratio of carboxylate:side chain = 1.0 |
| PCE-4 | Copolymer of methallyl alcohol-started polyethylene oxide (Mn = 2400 g/mol), acrylic acid and 2-hydroxy acrylate in a molar ratio of 0.625:0.416:2.80 |
| PCE-5 | Copolymer of methallyl alcohol-started polyethylene oxide (Mn = 2400 g/mol) and acrylic acid in a molar ratio of 1:3.5 |
| Sodium gluconate | Sigma Aldrich (>99%) |
| Molasses | Untreated molasses from sugar production from cane sugar (solids content about 80% by weight; pH = 5.5) |
| TIPA | triisopropanolamine, Sigma-Aldrich (95%) |
| MDIPA | N-methyldiisopropanolamine, Eastman (>95%) |
| SAP 1 | Floset 27CC from SNF Floerger |
| SAP 2 | Postcrosslinked polyacrylate (BASF HySorb ® B6600) |
| Hexylene glycol | 2-Methylpentane-2,4-diol, Sigma-Aldrich (99%) |
| Surfactant | Isononanoic acid alkoxylated with 12 polyethylene oxide units |

In a first variant, pulverulent mineral material according to the present invention was produced in a dry method. For this purpose, fully hydrated CEM I cement was ground in a pinned disk mill under a $CO_2$ atmosphere (5% by volume of $CO_2$) to a particle size of 0-250 μm. This powder is designated Powder 1.

In a second variant, pulverulent mineral material according to the present invention was produced in a wet method. This method was identical to the method described in WO2014154741 (page 18 lines 2-29). This powder is designated Powder 2.

Composite binders were produced by mixing Powder 1/Powder 2 with CEM I 42.5 R cement in a tumbling mixer until there was a visually homogeneous powder. The composite binders were designated Binder C-E and had the following composition:

TABLE 2

| | Composition of the composite binders |
|---|---|
| Binder C | Mixture of CEM I 42.5 R and Powder 1 (weight ratio 82:18) |
| Binder D | Mixture of CEM I 42.5 R and Powder 1 (weight ratio 65:35) |
| Binder E | Mixture of CEM I 42.5 R and Powder 2 (weight ratio 88:12) |

Slump was ascertained in accordance with EN 1015-3 with a cone of volume 39 cm$^a$ at various times after the end of the mixing operation. Slump of <60 mm was not measured and was reported in each case as "<60".

The commencement of solidification was determined from an isothermal calorimetry method in accordance with ASTM C1702-17. For this purpose, the exothermicity of hydration was recorded using a CAL 8000 instrument from Calumetrix. The commencement of solidification corresponds to that point on the exothermicity curve against time at which a first local minimum was measured.

Compressive strengths and flexural tensile strengths were measured according to standard EN 196-1.

Example 1

Example 1 illustrates the efficacy of various process auxiliaries in a method of the invention. The types and amounts of process auxiliaries specified in tables 3 and 4 were each added before commencement of the disintegration operation in the production of Powder 1. The pulverulent mineral material obtained, with or without process auxiliary, was tested as part of a composite binder in mortar mixtures. For this purpose, 450 g of the binder specified in tables 2 and 3 was mixed with 1350 g of sand (CEN 0-2 mm standard sand) and 225 g of water. Examples 1-4 to 1-10 and 1-12 to 1-14 are inventive, whereas examples 1-1, 1-2, 1-3 and 1-11 are noninventive comparative examples.

For the examples in table 4, combinations of 2 process auxiliaries were used. All examples 1-19 to 1-21 are inventive examples.

TABLE 4

Examples 1-19 to 1-21

|  | 1-19 | 1-20 | 1-21 |
|---|---|---|---|
| Binder | C | C | D |
| Process auxiliary 1 | 0.05* PCE-4 | 0.05* PCE-2 | 0.1* PCE-2 |
| Process auxiliary 2 | 165** TIPA | 200** MDIPA | 165** TIPA |
| Slump 3 min [mm] | 200 | 195 | not measured |
| Compressive strength 1 d [MPa] | 11 | 11.1 | 11.5 |
| Compressive strength 2 d [MPa] | 22.2 | 19.2 | 21.6 |
| Compressive strength 28 d [MPa] | 43.6 | | |
| Flexural tensile strength 1 d [MPa] | 3.2 | 2.9 | 3 |
| Flexural tensile strength 1 d [MPa] | 4.6 | 4.1 | 4.3 |
| Flexural tensile strength 1 d [MPa] | 6.9 | | |

*Dosage in % by weight based on the proportion of Powder 1
**Dosage in ppm based on the binder As apparent from tables 3 and 4, process auxiliaries of the invention improve slump and strengths in general. This is

TABLE 3

Examples 1-1 to 1-14

|  | 1-1 | 1-2 | 1-3 | 1-4 | 1-5 | 1-6 | 1-7 |
|---|---|---|---|---|---|---|---|
| Binder | A | B | C | C | C | C | C |
| Process auxiliary | | | | 0.1* PCE-5 | 0.1* PCE-4 | 0.1* PCE-3 | 0.1* PCE-2 |
| Slump 3 min [mm] | 190 | 188 | 184 | 201 | 194 | 202 | 206 |
| Compressive strength 1 d [MPa] | 13.6 | 10 | 9 | 10.8 | 10.5 | 9.9 | 9.4 |
| Compressive strength 2 d [MPa] | 23.8 | 18.4 | 17.4 | 20.1 | 19.3 | 19.8 | 17.7 |
| Compressive strength 28 d [MPa] | 48.9 | 37.9 | 35.2 | 36 | 37.6 | 38.3 | 37.5 |
| Flexural tensile strength 1 d [MPa] | 3.1 | 2.8 | 2.5 | 2.8 | 2.9 | 2.5 | 2.7 |
| Flexural tensile strength 2 d [MPa] | 4.6 | 4.3 | 4.1 | 4.4 | 4.5 | 4.1 | 4.1 |
| Flexural tensile strength 28 d [MPa] | 7.1 | 6.2 | 5.7 | 5.7 | 6.3 | 6.0 | 6.6 |
|  | 1-8 | 1-9 | 1-10 | 1-11 | 1-12 | 1-13 | 1-14 |
| Binder | C | C | C | D | D | D | D |
| Process auxiliary | 0.17* PCE-1 | 0.1* sodium gluconate | 0.08* molasses | | 0.1* PCE-4 | 0.1* PCE-2 | 0.1* sodium gluconate |
| Slump 3 min [mm] | 200 | n.m. | 197 | 170 | 204 | 203 | 195 |
| Compressive strength 1 d [MPa] | 11 | 11.3 | 7.3 | 6 | 6.8 | 6.8 | 6.5 |
| Compressive strength 2 d [MPa] | 19.7 | 21.8 | 18.7 | 12.9 | 14.8 | 14.9 | 15.2 |
| Compressive strength 28 d [MPa] | 38.1 | 41 | 38.2 | 26.6 | 30.6 | 29.7 | 31 |
| Flexural tensile strength 1 d [MPa] | 3 | 2.9 | 2.1 | 1.6 | 1.8 | 1.9 | 1.8 |
| Flexural tensile strength 1 d [MPa] | 4.2 | 4.8 | 3.9 | 3.1 | 3.1 | 3.4 | 3.4 |
| Flexural tensile strength 1 d [MPa] | 6.1 | 6.7 | 6.1 | 4.6 | 5.5 | 4.8 | 5.7 |

*Dosage in % by weight based on the proportion of Powder 1 true in a comparison of the mortar samples comprising binder comprising pulverulent mineral material and process auxiliary according to the present invention with mortar samples comprising the same binder but no process auxiliaries (cf. examples 1-4 to 1-10 with example 1-3, and examples 1-12 to 1-14 with example 1-11). The use of a combination of PCE and alkanolamine leads to a further improvement compared to use of PCE alone (see table 4). Finally, it is remarkable that the use of process auxiliaries of the invention has the effect that a cement containing 18% by weight of a pulverulent mineral material from a method of the invention has essentially the same or improved strengths compared to a standardized CEM II/A-LL (compare example 1-2 with the inventive examples).

Example 2

Example 2 illustrates the efficacy of process auxiliaries of the invention for prevention of the tendency of the starting material to cake, especially demolition rubble or building waste for a method according to the present invention. A low tendency of the starting material to cake is important in a method of the invention since carbonation and disintegration otherwise cannot proceed efficiently.

Tendency to caking was tested in a method in accordance with standard EN 1097-6. This involves assessing the stability of a compacted concrete/sand cone. In the example, coarse concrete sand (0-4 mm, water demand according to EN 1097-6 of 10.5% by weight) was first dried at 110° C. and then wetted with water in the amount specified in table 5. The stability of such a sample was then tested according to EN 1097-6 by assessing the tendency of a concrete/sand cone to collapse. In addition, samples of the same water-wetted coarse concrete sand were admixed with the process auxiliaries specified in table 5 in the amount specified therein. The stability of these samples too was tested to EN 1097-6. In the case of success, the firm concrete sand (corresponding to image F.1 in EN 1097-6) gives rise to a free-flowing bulk material, indicated by almost complete collapse of the concrete/sand cone, but in which a clear peak can still be seen (corresponding to image F.3 of EN 1097-6). However, excessive drying should be avoided (corresponding to image F.4 of EN 1097-6).

TABLE 5

Examples 2-1 to 2-9

| | 2-1 | 2-2 | 2-3 | 2-4 | 2-5 |
|---|---|---|---|---|---|
| Added water [% by wt. based on concrete sand] | 13.1 | 13.1 | 13.1 | 16.3 | 16.3 |
| Process auxiliary [% by wt. based on concrete sand] | 0.2 SAP-1 | 0.3 SAP-1 | 0.4 SAP-1 | 0.3 SAP-1 | 0.3 SAP-1 |
| Assessment of concrete/sand cone according to EN 1097-6 | F.1 firm | F.3 free-flowing | F.4 dry | F.1 firm | F.3 free-flowing |

| | 2-6 | 2-7 | 2-8 | 2-9 |
|---|---|---|---|---|
| Added water [% by wt. based on concrete sand] | 16.3 | 16.3 | 11 | 11.4 |
| Process auxiliary [% by wt. based on concrete sand] | 0.6 SAP-2 | 0.8 SAP-2 | 0.15 Hexylene glycol | 0.1 Surfactant |
| Assessment of concrete/sand cone according to EN 1097-6 | F.1 firm | F.3 free-flowing | F.3 free-flowing | F.3 free-flowing |

As apparent from table 5, addition of a suitable amount of process auxiliary can give a free-flowing mixture. In other words, the caking tendency of a starting material can be reduced, which constitutes a great advantage with regard to the implementability of a method of the invention.

Example 3

Example 3 illustrates the efficacy of process auxiliaries in a wet method. The types and amounts of process auxiliaries specified in table 6 were each added before commencement of the disintegration operation in the production of Powder 2. The pulverulent mineral material obtained, with or without process auxiliary, was tested as part of a composite binder in cement suspensions. For this purpose, the respective binder was mixed with water in a weight ratio of binder to water of 0.4. Examples 3-3 to 3-5 are inventive, whereas examples 3-1 and 3-2 are noninventive comparative examples.

The commencement of solidification was determined in a heat flow curve that was measured in an isothermal process in accordance with standard ASTM C1702-17. An i-CAL 8000 instrument from Calmetrix was used. The commencement of solidification is the time at which a first local minimum of the heat flow against time was attained.

TABLE 6

Examples 3-1 to 3-5

| | 3-1 | 3-2 | 3-3 | 3-4 | 3-5 |
|---|---|---|---|---|---|
| Binder | B | E | E | E | E |
| Process auxiliary | | | 2.5* PCE-5 | 3.3* PCE-5 | 5* PCE-5 |
| Slump 3 min [mm] | 103 | 58 | 81 | 106 | 185 |
| Commencement of solidification [min] | 96 | 72 | 102 | 120 | 120 |

*Dosage in % by weight based on the proportion of Powder 2

It is found that use of process auxiliaries of the invention in a wet method can distinctly improve the flowability of resulting cements.

The invention claimed is:

1. A method of obtaining at least one of treated aggregates and treated pulverulent mineral material from a starting material comprising hardened mineral binder and aggregates, the method comprising:
  a) treating the starting material in a disintegration operation in which the hardened mineral binder is at least partly carbonated by reacting the starting material with carbon dioxide, and removed from the surface of the aggregates in the starting material so as to give a pulverulent disintegration product; and
  b) separating off the treated starting material at a predefined grain size limit in order to obtain at least one of the treated aggregates having a grain size of at least the predefined grain size limit and the treated pulverulent mineral material having a grain size below the predefined grain size limit,
  wherein at least one process auxiliary selected from the group consisting of at least one of polycarboxylate ethers and esters (PCE), glycols, organic amines, ammonium salts of organic amines with carboxylic acids, surfactants, gemini surfactants, calcium stearate, alkoxylated phosphonic or phosphoric esters, propane-1,3-diol, carboxylic acids, sulfonated amino alcohols, boric acid, salts of boric acid, borax, salts of phosphoric acid, gluconate, iron sulfate, tin sulfate, antimony salts, alkali metal salts, alkaline earth metal salts, lignosulfonates, glycerol, melamine, melamine sulfonates, water absorbents in a form of a superabsorbent polymer or in a form of a sheet silicate, anticaking agents, sugars, sugar acids, sugar alcohols, phosphates, and phosphonates, is added to the starting material before the disintegration operation a), during the disintegration operation a), and/or during the separation b).

2. The method as claimed in claim 1, wherein the process auxiliaries comprise at least one alkanolamine selected from the group consisting of monoethanolamine, diethanolamine, triethanolamine (TEA), diethanolisopropanolamine (DEIPA), ethanoldiisopropanolamine (EDIPA), isopropanolamine, diisopropanolamine, triisopropanolamine (TIPA), N-methyldiisopropanolamine (MDIPA), N-methyldiethanolamine (MDEA), tetrahydroxyethylethylenediamine (THEED) and tetrahydroxyisopropylethylenediamine (THIPD), and salts of these alkanolamines.

3. The method as claimed in claim 1, wherein the process auxiliaries comprise at least one of glycols and glycerol, the glycols selected from the group consisting of monoethylene glycol, diethylene glycol, triethylene glycol, tetraethylene glycol, pentaethylene glycol, polyethylene glycol, neopentyl glycol, hexylene glycol, propylene glycol, dipropylene glycol, and polypropylene glycol.

4. The method as claimed in claim 1, wherein the process auxiliaries comprise at least one of at least one polycarboxylate ether and at least one polycarboxylate ester (PCE).

5. The method as claimed in claim 4, wherein the at least one PCE is a copolymer comprising:
(i) repeat units A of general structure (I),

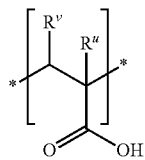
(I)

and
(ii) repeat units B of general structure (II),

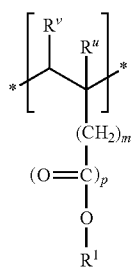
(II)

where each $R^u$ is independently hydrogen or a methyl group, each $R^v$ is independently hydrogen or COOM, where M is independently H, an alkali metal, or an alkaline earth metal,
m=0, 1, 2 or 3,
p=0 or 1, each $R^1$ is independently $-(CH_2)_z-[YO]_n-R^4$ where Y is a C2- to C4-alkylene and $R^4$ is a H, C1- to C20-alkyl, -cyclohexyl, -alkylaryl, or a $-N(-R^i)_j-[(CH_2)_z-PO_3M]_{3-j}$, Z=0, 1, 2, 3 or 4, n=2-350, j=0, 1 or 2, $R^i$ is a hydrogen atom or an alkyl group having 1-4 carbon atoms, and M is a hydrogen atom, an alkali metal, an alkaline earth metal or an ammonium ion,
wherein the repeat units A and B in the PCE have a molar ratio of A:B in the range of 10:90-90:10.

6. The method as claimed in claim 4, wherein, in addition to the at least one PCE, at least one further process auxiliary is used, and
the at least one further process auxiliary is selected from the group consisting of glycols, alkanolamines, nonionic surfactants, lignosulfonates, glycerol, water absorbents in a form of a superabsorbent polymer or in a form of a sheet silicate, and anticaking agents.

7. The method as claimed in claim 1, wherein the process auxiliaries comprise at least one selected from the group consisting of sodium lignosulfonate, magnesium lignosulfonate, and calcium lignosulfonate.

8. The method as claimed in claim 1, wherein the process auxiliaries comprise a water absorbent, and
the water absorbent is a superabsorbent polymer or sheet silicate.

9. The method as claimed in claim 1, wherein the process auxiliaries comprise a surfactant selected from the group consisting of fatty acid alkoxylates, alkoxylated alcohols, alkyl phenol alkoxylates, alkoxylated polycondensates, fatty acid amide alkoxylates, esters of fatty acids, sorbitan, glycerol or pentaerythritol, alkoxylated alkylamines having an alkyl radical consisting of 6-20 carbon atoms, alkylglycosides, alkylglucamides, alkoxylated sorbitans, lauryl ether sulfonates, naphthalenesulfonates, hydrophobized starches, hydrophobized celluloses, and siloxane-based nonionic surfactants.

10. The method as claimed in claim 1, wherein the at least one process auxiliary is added to the starting material before the disintegration operation a).

11. The method as claimed in claim 1, wherein the at least one process auxiliary is added at least one of during the disintegration operation a) and during the separation b).

12. The method as claimed in claim 1, wherein a mixture of two or more process auxiliaries is added.

13. The method as claimed in claim 12, wherein the mixture of the two or more process auxiliaries is added in the form of a premix.

14. The method as claimed in claim 12, wherein the two or more process auxiliaries are added separately from one another.

15. The method as claimed in claim 1, wherein in step a) the reaction of the starting material with carbon dioxide is continued until a pH of the treated starting material in a range of 7-10 is attained.

16. A method for production of hydraulic compositions comprising the steps of:
(i) obtaining aggregates and/or pulverulent mineral material by the method as claimed in claim 11, and
(ii) mixing the aggregates and/or pulverulent mineral materials obtained with mineral binder, and optionally further admixtures and/or water.

17. The method as claimed in claim 16, wherein the mineral binder is a hydraulic binder.

* * * * *